United States Patent [19]

Brandener

[11] Patent Number: 5,203,593
[45] Date of Patent: Apr. 20, 1993

[54] FLEXIBLE EXHAUST COUPLING WITH GASKET CRUSH REDUCING RESILIENT MEMBERS

[75] Inventor: Louis Brandener, Poissy, France

[73] Assignee: Societe Jacques Dubois, Barentin, France

[21] Appl. No.: 526,707

[22] Filed: May 22, 1990

[30] Foreign Application Priority Data

May 26, 1989 [FR] France ................. 89 06941

[51] Int. Cl.⁵ .......................................... F16L 55/04
[52] U.S. Cl. .......................... 285/49; 285/267; 285/910; 285/263; 285/234; 267/147
[58] Field of Search ............... 285/49, 267, 231, 234, 285/277, 363, 374, 416, 910, 263, 268; 403/220, 291; 267/147, 136; 911/546, 904, 905, 906

[56] References Cited

U.S. PATENT DOCUMENTS

| | | | |
|---|---|---|---|
| 853,003 | 5/1907 | Collins | 285/910 X |
| 2,328,168 | 8/1943 | Risley | 285/374 X |
| 2,869,858 | 1/1959 | Hartwell | 267/147 |
| 3,416,782 | 7/1966 | Warnaka | 267/147 |
| 3,566,510 | 3/1971 | Wendt | 285/49 X |
| 3,951,418 | 4/1976 | Dryer | 285/267 |
| 4,097,071 | 6/1978 | Crawford et al. | 285/234 X |
| 4,463,959 | 8/1984 | Usher et al. | 285/412 X |
| 4,607,851 | 8/1986 | Usher | 277/1 |
| 4,747,624 | 5/1988 | Faber et al. | 285/231 |
| 4,863,200 | 9/1989 | Brandener | 285/234 |
| 4,871,181 | 10/1989 | Usher et al. | 285/910 X |
| 4,928,998 | 5/1990 | Brandener | 285/910 X |
| 5,040,805 | 8/1991 | Ozora | 285/267 |
| 5,149,068 | 9/1992 | Brandener | 267/147 |

FOREIGN PATENT DOCUMENTS

| | | |
|---|---|---|
| 197287 | 3/1986 | European Pat. Off. . |
| 2829333 | 5/1979 | Fed. Rep. of Germany . |
| 2838990 | 3/1980 | Fed. Rep. of Germany . |
| 3317512 | 12/1984 | Fed. Rep. of Germany . |
| 1071214 | 11/1952 | France ................. 267/147 |
| 2509005 | 1/1983 | France . |
| 1145204 | 3/1985 | U.S.S.R. . |
| 229805 | 3/1925 | United Kingdom . |
| 2107815 | 5/1983 | United Kingdom . |

OTHER PUBLICATIONS

Patent abstracts of Japan vol. 8 No. 258 (M 340) (1695) Nov. 27, 1984 & JP-A-59131722 Mazda Jul. 28, 1984.

*Primary Examiner*—Eric K. Nicholson
*Attorney, Agent, or Firm*—Griffin, Butler, Whisenhunt & Kurtossy

[57] ABSTRACT

The exhaust coupling of the invention comprises a first length of tubing having a first assembly flange fixed thereon, a second length of tubing associated with a second assembly flange, clamping means disposed to urge the assembly flanges towards each other via first resilient members, and second resilient members disposed between the assembly flanges in order to be compressed therebetween and to exert a force on the flange which is less than the opposing force exerted thereon by the first resilient members.

4 Claims, 2 Drawing Sheets

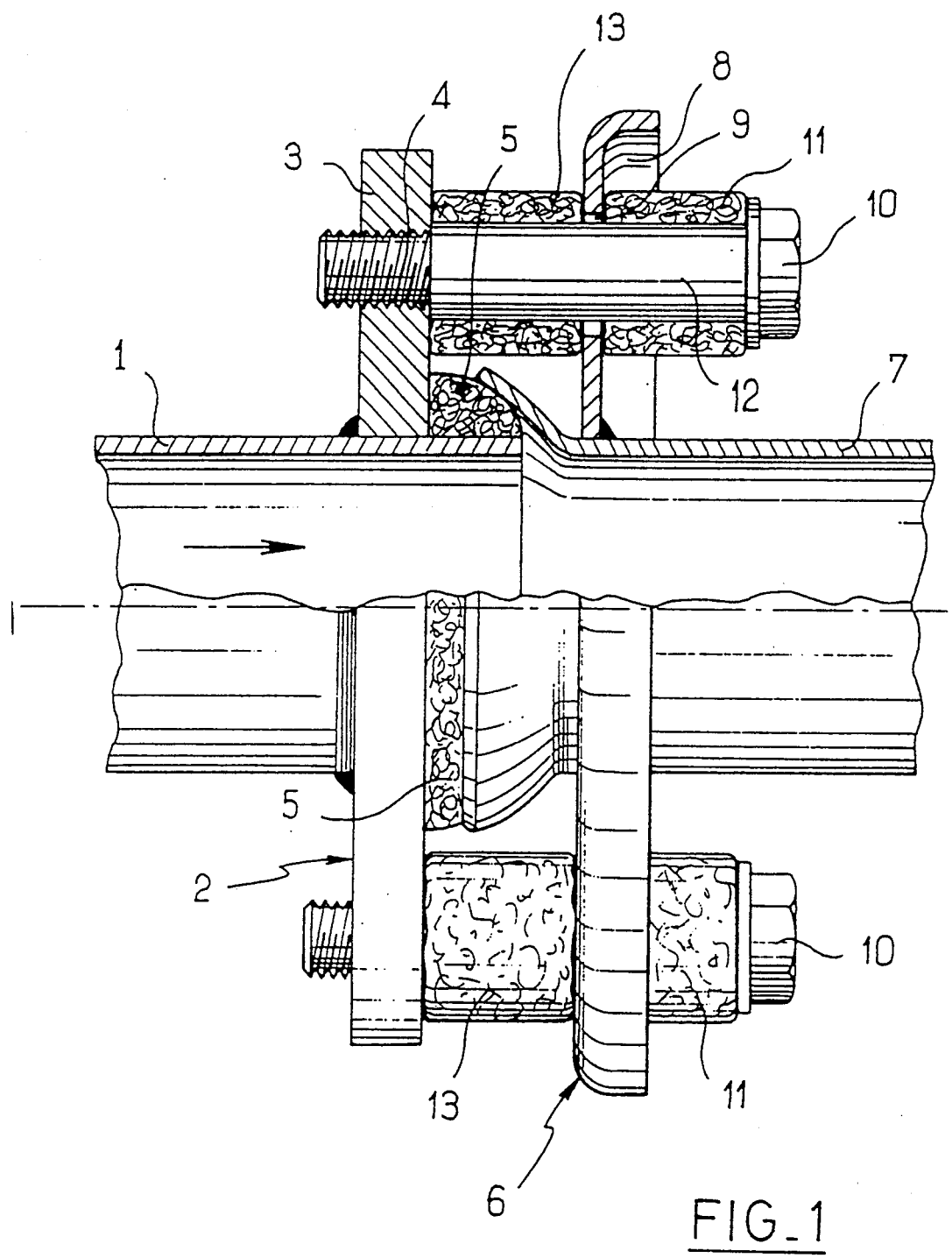
FIG_1

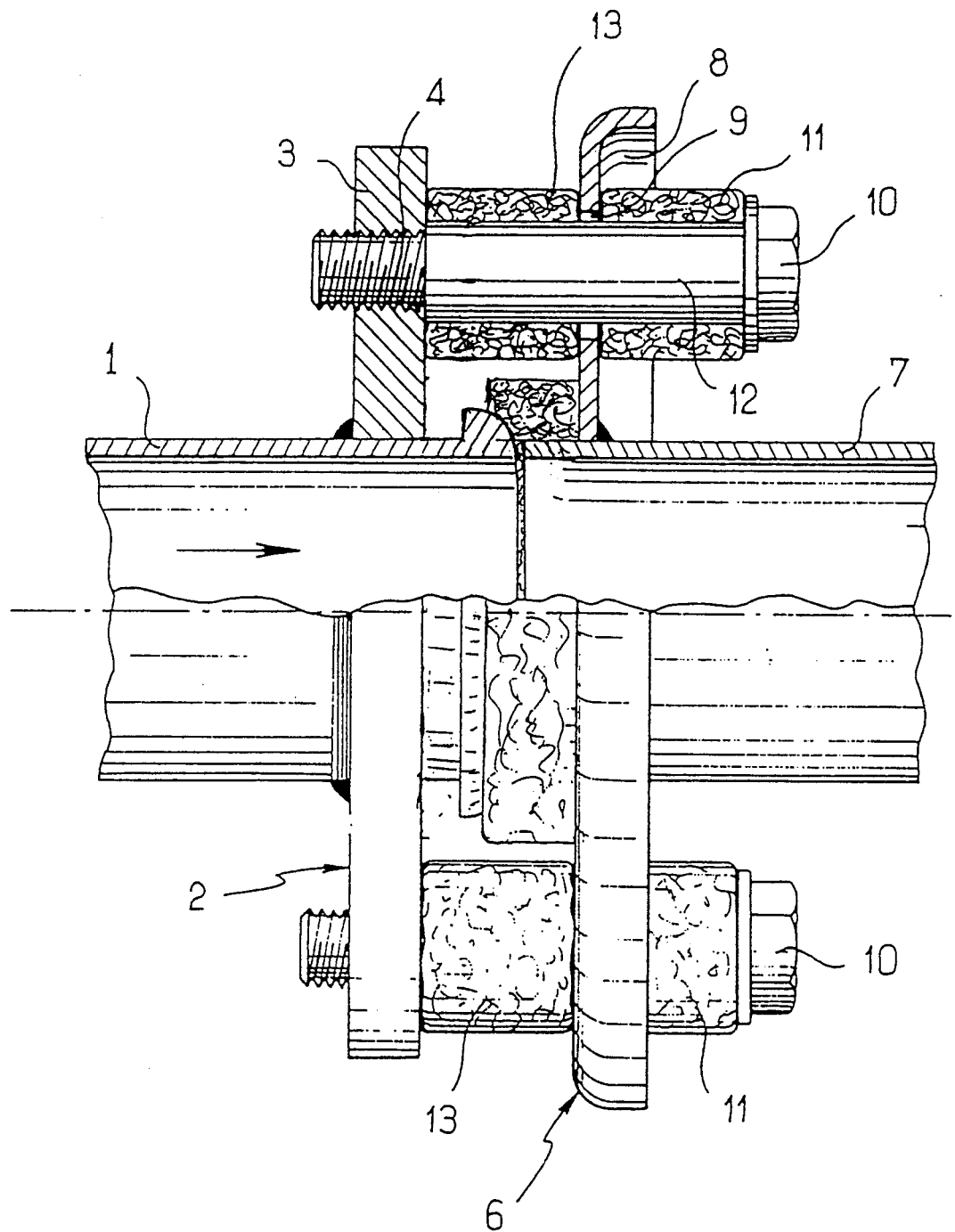
FIG_2

FLEXIBLE EXHAUST COUPLING WITH GASKET CRUSH REDUCING RESILIENT MEMBERS

The present invention relates to an exhaust coupling comprising a ball-and-socket coupling device between two lengths of exhaust tube.

BACKGROUND OF THE INVENTION

When assembling a car, and in particular a car having a transversely-mounted engine, a flexible coupling needs to be provided between the exhaust manifold which is fixed to the engine and the exhaust pipe which is fixed to the bodywork which supports the silencer or muffler.

In order to take up relative movement between the manifold and the exhaust pipe, and in order to provide sealing, one of the lengths of tubing is terminated by a convex spherical bearing surface made at the end of the tubing itself or formed by an annular gasket, and co-operating with a complementary surface on the other length of exhaust tubing. In order to hold the parts together, the exhaust manifold and the exhaust pipe are both provided in this case with assembly flanges, each associated with a length of tubing and connected to each other by bolts having thrust springs mounted therearound in order to ensure sealing and coupling.

During relative movement of the two lengths of exhaust tubing, the two spherical surfaces rub against each other and generate vibrations which are extremely disagreeable. The level of such vibrations has already been reduced by providing a special structure for a gasket between the facing ends of the lengths of exhaust tubing. However, the vibrations generated by friction between the various parts of the coupling when in use has not yet been completely eliminated.

Since the generation of vibrations cannot be completely eliminated, an object of the invention is to minimize such vibrations.

SUMMARY OF THE INVENTION

In order to achieve this object, the present invention provides a flexible exhaust coupling comprising a first length of tubing terminated by a convex spherical bearing portion, a first assembly flange associated with the first length of tubing, a second length of tubing terminated by a concave spherical bearing portion facing the convex spherical portion of the first length of tubing, a second assembly flange associated with the second length of tubing, and clamping means disposed to urge the assembly flanges towards each other via first resilient members, wherein second resilient members are disposed between the assembly flanges in order to be compressed therebetween when the clamping means are put into place, the second resilient members exhausting a force on the flanges which is less than the opposing force exerted on the flanges by the first resilient members.

Thus, while providing sufficient cohesion force to the first resilient members for holding the ends of the lengths of exhaust tubing suitably applied against each other, even when the motor is vibrating, the friction force between the ends of the lengths of exhaust tubing is minimized, thereby reducing the vibrations generated by oscillations of the coupling.

In an advantageous aspect of the invention in which the clamping means comprise bolts, at least a portion of the resilient members comprise resilient compressed steel wire knit sleeves disposed around shanks of the bolts. Thus, not only is the friction force reduced, but such vibrations as are generated are also damped.

BRIEF DESCRIPTION OF THE DRAWING

Other characteristics and advantages of the invention appear from reading the following description of a non-limiting embodiment described with reference to the drawings where FIG. 1 is an elevation view in partial section on an axial plane through the coupling of the invention where a spherical ring is one of the two tubes, and FIG. 2 shows a similar view but where the spherical ring is on the opposite tube.

DETAILED DESCRIPTION

With reference to the figures, the flexible exhaust coupling of the invention comprises a first length of tubing 1 on which a first assembly flange 2 is fixed, e.g. by welding, said flange comprising, in conventional manner, fins 3 including tapped holes 4. An annular gasket 5 is mounted at the end of this first length of tubing 1 and has one of its faces bearing against the first assembly flange 2. The annular gasket 5 includes an outer thrust surface which is spherically convex and which bears against a spherically concave thrust surface disposed facing it and formed at the end of a second length of exhaust tubing 7 which has a second assembly flange 6 fixed thereto. The second assembly flange 6 includes fins 8 having holes 9 therethrough.

Clamping means constituted by bolts 10 pass through the holes 9 and are screwed in the tapped holes 4, thereby urging the assembly flanges 2 and 6 towards each other via first resilient members constituted by resilient sleeves 11 disposed around the shanks 12 of the bolts 10. The resilient sleeves 11 are preferably made of knitted steel wire. For example, they may be obtained by knitting a tubing using steel wire having a diameter of 0.1 mm to 0.3 mm and a breaking strength of 100 daN/mm$^2$ or more, and then in rolling up the knitted tubing laid flat over a cylindrical preform and compressed axially.

In conventional manner, the holes 9 are oversized to allow the second length of tubing to oscillate relative to the first length of tubing. If necessary for preventing the resilient sleeves 11 from penetrating into the holes 9, separating washers may be provided between the assembly flange 6 and the adjacent ends of the resilient sleeves 11.

Second resilient members constituted by resilient sleeves 13 are disposed around the shanks 12 of the bolts 10 between the assembly flanges 2 and 6 in order to be compressed therebetween when the clamping bolts 10 are tightened. The length of the resilient sleeves 13 and 11 when at rest is designed so that after the bolts 10 have been tightened, the force exerted by the resilient sleeves 13 on the assembly flanges is less than the opposing force exerted by the resilient sleeves 11 on the clamping flange that they face. These lengths are readily determined by using characteristics curves for the resilient sleeves specifying compression force as a function of sleeve length. In this context, it may be observed that the resilient sleeves 13 are preferably made in the same way as the resilient sleeves 11 by knitting steel wire.

In order to exert a reaction force against the assembly flanges, the length of the sleeves 13 when at rest is naturally greater than the distance between the assembly flanges when the convex outer surface of the annular gasket 5 is merely in contact with the concave inner surface of the end of the second length of tubing 7, with the parts being at rest, i.e. when the two lengths of tubing extend in alignment.

When the coupling is being assembled, the first length of tubing is fitted with the annular gasket 5 which, in the embodiment shown, is likewise made from a sleeve of knitted steel wire that has been compressed axially. The first resilient sleeves 11 are engaged on the bolts 10 and then the bolts 10 are engaged through the holes 9 in the assembly flange 6 and the second resilient sleeves 13 are mounted on the bolts 10. The two lengths of tubing to be assembled together are disposed facing each other and the bolts 10 are screwed into the tapped holes 4. At the beginning of this operation, the concave end of the second length of tubing 7 is not yet in contact with the convex surface of the annular gasket 5 and the compression on the resilient sleeves 11 and 13 is thus balanced. As soon as the concave end of the second length of tubing 7 makes contact with the annular gasket 5, the force exerted by the resilient sleeves 11 is compensated by the sum of the forces exerted by the resilient sleeves 13 and by the annular gasket 5. For example, a coupling of the invention may be provided by exerting a compression force of 60 kg on each of the resilient sleeves 11 and by selecting resilient sleeves 13 of a length such that a reaction force of 40 kg is exerted by each of the resilient sleeves 13. The thrust force of the second length of exhaust tubing on the annular gasket 5 is thus 40 kg instead of being 120 kg as it would be in the absence of the second resilient sleeves 13 (assuming that there are two bolts, as shown) and, thus, avoids crushing of the annular gasket 5. Bench testing has shown that the vibrations generated are completely non-existent in the audible frequency range.

In addition, it has been observed that sealing of the coupling is maintained. When vibrations originating in the engine or in vehicle reaction on the road tend to move the two lengths apart from each other, the amount of compression in the first resilient sleeves 11 increases while the amount of compression in the second resilient sleeves 13 diminishes. This change in compression gives rise to a corresponding variation in the applied force and therefore tends to return the two lengths of exhaust tubing into contact with each other.

Naturally the invention is not limited to the embodiment described and variants may be applied thereto without going beyond the scope of the invention. In particular, although the invention has been described with first resilient members 11 and second resilient members 13 constituted by resilient compressed metal knit sleeves, some or all of these resilient members may be replaced, without going beyond the scope of the invention, by other resilient members, e.g. springs.

Similarly, although the invention has been described with reference to a coupling where the first length of tubing is terminated by a convex spherical thrust portion formed by a compressed metal knit annular gasket, the coupling of the invention could also be made by providing a rigid convex portion having the concave portion of the second length of tubing bearing thereagainst in resilient manner because of the resilience of the metal constituting the second length of tubing.

As shown in FIG. 2, alternatively, a coupling of the invention may also be made by providing the first length of tubing with an end in the form of a convex spherical ring integral with said length and by providing a resilient annular gasket having a concave surface and carried by the second length of tubing.

Although the invention has been described with resilient sleeves 13 surrounding the shanks 12 of bolts 10, the second resilient members may be mounted at any point between the assembly flanges in order to exert a force opposing the force exerted by the first resilient means, thereby reducing the friction force on the spherical coupling portions.

I claim:

1. A flexible exhaust coupling comprising a first length of tubing having one end on which is mounted a resilient annular gasket having a convex spherical bearing portion, a first assembly flange associated with the first length of tubing, a second length of tubing terminated by a concave spherical bearing portion facing the convex spherical portion of the resilient annular gasket, a second assembly flange associated with the second length of tubing, and a clamping means, including a first resilient member, disposed to urge the assembly flanges towards each other and to tighten the gasket and resilient means compressibly disposed between the assembly flanges for generating a force opposite to and less than a force generated by the first resilient member so as to reduce the force on the flanges when the clamping means is tightened and avoid crushing of the annular gasket while maintaining the sealing of the coupling.

2. An exhaust coupling according to claim 1, in which the clamping means comprise bolts and wherein said resilient means comprise resilient compressed steel wire knit sleeves disposed around shanks of the bolts.

3. A flexible exhaust coupling comprising a first length of tubing terminated by a convex spherical bearing portion, a first assembly flange associated with the first length of tubing, a second length of tubing having one end on which is mounted a resilient annular gasket having a concave spherical bearing portion facing the convex spherical portion of the first length of tubing, a second assembly flange associated with the second length of tubing, and clamping means, including a first resilient member, disposed to urge the assembly flanges towards each other and to tighten the gasket and resilient means compressibly disposed between the assembly flanges and generating a force opposite and less than a force generated by the first resilient member so as to reduce the force on the flanges when the clamping means is tightened and avoid crushing of the annular gasket while maintaining the sealing of the coupling.

4. An exhaust coupling according to claim 3, in which the clamping means comprise bolts and wherein said resilient means comprise resilient compressed steel wire knit sleeves disposed around shanks of the bolts.

* * * * *